United States Patent
Plastina

(10) Patent No.: US 10,354,076 B2
(45) Date of Patent: *Jul. 16, 2019

(54) DISSOLVABLE PROTECTION OF CANDIDATE SENSITIVE DATA ITEMS

(71) Applicant: Microsoft Technology Licensing, LLC, Redmond, WA (US)

(72) Inventor: Daniel Plastina, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/710,005

(22) Filed: Sep. 20, 2017

(65) Prior Publication Data

US 2018/0025164 A1    Jan. 25, 2018

Related U.S. Application Data

(63) Continuation of application No. 14/296,217, filed on Jun. 4, 2014, now Pat. No. 9,773,117.

(51) Int. Cl.
*G06F 21/60* (2013.01)
*G06F 16/22* (2019.01)
*G06F 21/62* (2013.01)

(52) U.S. Cl.
CPC .......... *G06F 21/60* (2013.01); *G06F 16/2291* (2019.01); *G06F 21/602* (2013.01); *G06F 21/6245* (2013.01)

(58) Field of Classification Search
CPC .. G06F 21/60; G06F 16/2291; G06F 21/6245; G06F 21/602
See application file for complete search history.

(56) References Cited

U.S. PATENT DOCUMENTS

| | | |
|---|---|---|
| 7,428,636 B1 | 9/2008 | Waldspurger et al. |
| 7,546,334 B2 | 6/2009 | Redlich et al. |

(Continued)

FOREIGN PATENT DOCUMENTS

| | | |
|---|---|---|
| GB | 2422455 A | 7/2006 |
| JP | 2007188490 A | 7/2007 |
| JP | 2013137740 A | 7/2013 |
| RU | 2274899 C2 | 4/2006 |

OTHER PUBLICATIONS

"First Office Action Issued in Chinese Patent Application No. 201580029519.5", dated Oct. 12, 2018, 12 Pages.

(Continued)

*Primary Examiner* — Eleni A Shiferaw
*Assistant Examiner* — Cheng-Feng Huang
(74) *Attorney, Agent, or Firm* — Workman Nydegger

(57) ABSTRACT

Reducing risk of data loss by automatically background scanning a data set to detect a plurality of candidate sensitive data items. For at least some of those candidate sensitive data items that are deemed not to concretely classified as sensitive, a dissolvable encryption is applied to the data item to at least temporarily protect the data item. When the user requests access to the data item, the system determines that the data item has been dissolvably encrypted and that the user is authorized to define the sensitivity of the data item. In response, the user is allowed to direct the system as to whether the data item is to be concretely encrypted (such as if the user was to confirm the data item as sensitive), or whether the dissolvable encryption of the data item is to be dissolved (such as if the user was to confirm the data item as not sensitive).

20 Claims, 6 Drawing Sheets

(56) References Cited

U.S. PATENT DOCUMENTS

| | | | |
|---|---|---|---|
| 8,448,258 | B2 | 5/2013 | Abuelsaad et al. |
| 8,561,127 | B1 | 10/2013 | Agrawal et al. |
| 9,013,732 | B1* | 4/2015 | Madhukar ............. G06F 17/214 358/1.1 |
| 9,141,808 | B1 | 9/2015 | Agrawal et al. |
| 9,268,958 | B1* | 2/2016 | Kessler .................. G06F 21/62 |
| 9,691,027 | B1* | 6/2017 | Sawant ................. G06F 21/604 |
| 9,779,254 | B2* | 10/2017 | Galil ..................... G06F 21/552 |
| 2003/0097583 | A1 | 5/2003 | Lacan et al. |
| 2003/0120601 | A1 | 6/2003 | Ouye et al. |
| 2004/0003289 | A1 | 1/2004 | Bhogal et al. |
| 2005/0044409 | A1* | 2/2005 | Betz ................... G06F 21/6245 726/4 |
| 2007/0157287 | A1 | 7/2007 | Lim |
| 2008/0282359 | A1 | 11/2008 | Aschen et al. |
| 2010/0191975 | A1 | 7/2010 | Chase et al. |
| 2011/0040967 | A1 | 2/2011 | Waller et al. |
| 2012/0198568 | A1 | 8/2012 | Abuelsaad et al. |
| 2012/0246696 | A1* | 9/2012 | Boukobza ........... G06F 21/6227 726/1 |
| 2012/0275597 | A1 | 11/2012 | Knox et al. |
| 2013/0046975 | A1 | 2/2013 | Kamijoh et al. |
| 2013/0159021 | A1* | 6/2013 | Felsher ................ G06F 19/328 705/3 |
| 2014/0068706 | A1 | 3/2014 | Aissi |
| 2014/0095868 | A1 | 4/2014 | Korthny et al. |
| 2014/0195798 | A1 | 7/2014 | Brugger et al. |
| 2014/0310527 | A1 | 10/2014 | Veugen et al. |
| 2014/0379901 | A1 | 12/2014 | Tseitlin et al. |
| 2016/0021079 | A1 | 1/2016 | Schimmelpfeng et al. |

OTHER PUBLICATIONS

"Office Action Issued in Mexican Patent Application No. MX/a/2016/016052", dated Apr. 16, 2018, 5 Pages.

"Data Classification", Retrieved From <<https://web.archive.org/web/20140331091239/http://www.pixalert.com/Data-Classification.pdf>>, Mar. 24, 2014, 2 Pages.

"HiSoftware Security Sheriff for File Shares", Retrieved From <<https://web.archive.org/web/20150206031020/http://www.hisoftware.com/products/hisoftware-security-sheriff/hisoftware-security-sheriff-for-file-shares.aspx>>, Feb. 9, 2013, 2 Pages.

"Identify Sensitive Data and Prevent Data Leaks", Retrieved From <<https://www.mcafee.com/in/resources/solution-briefs/sb-titus.pdf>>, Mar. 24, 2014, 2 Pages.

"Final Office Action Issued in U.S. Appl. No. 14/296,217", dated Nov. 3, 2016, 16 Pages.

"Non Final Office Action Issued in U.S. Appl. No. 14/296,217", dated Jan. 20, 2017, 17 Pages.

"Non Final Office Action Issued in U.S. Appl. No. 14/296,217", dated Mar. 22, 2016, 21 Pages.

"Notice of Allowance Issued in U.S. Appl. No. 14/296,217", dated May 30, 2017, 21 Pages.

Charbonneau, Stephane, "The Role of User Driven Security in Data Loss Prevention", In Proceedings of Computer Fraud & Security, vol. 11, Issue 11, Nov. 2011, 4 Pages.

"International Preliminary Report on Patentability Issued in PCT Application No. PCT/US2015/033635", dated Aug. 30, 2016, 7 Pages.

"International Search Report & Written Opinion Received for PCT Application No. PCT/US2015/033635", dated Oct. 29, 2015, 10 Pages.

"Second Written Opinion Issued in PCT Application No. PCT/US2015/033635", dated May 3, 2016, 8 Pages.

"Office Action Issued in Russian Patent Application No. 2016147356", dated Jan. 18, 2019, 9 Pages.

"Office Action Issued in Japanese Patent Application No. 2016-571269", dated Mar. 29, 2019, 9 Pages.

* cited by examiner

DISSOLVABLE PROTECTION OF CANDIDATE SENSITIVE DATA ITEMS

CROSS REFERENCE TO RELATED APPLICATION

This application is a continuation of U.S. patent application Ser. No. 14/296,217, filed Jun. 4, 2014, and titled "DISSOLVABLE PROTECTION OF CANDIDATE SENSITIVE DATA ITEMS," and which issues as U.S. Pat. No. 9,773,117 on Sep. 26, 2017. The entire contents of the foregoing application are incorporated by reference herein in their entirety.

BACKGROUND

In the information age, proper control of information is a key imperative. One aspect of such control is to prevent data from being lost or disclosed to unintended parties. Such loss and disclosure is often referred to as "data leakage". For instance, random strangers should not be able to gain access to credit card numbers, passwords, and other sensitive pieces of information that do not below to them. Furthermore, organizations often have strategic information that they would very much prefer to keep out of the hands of competitors.

Data Loss Prevention (or DLP) technologies are developed with the aim to prevent the inadvertent leakage of data. In one example DLP technology, the user helps identify that a data item (such as a file or email) is sensitive typically at the time that the user creates the data item. Another conventional DLP technology involves background scanning data items that have previously been created. For instance, a machine may read data items by applying regular expressions or more sophisticated pattern matching techniques. Once a data item is deemed sensitive, a series of actions can be taken, such as protecting the data item through encryption.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to reducing risk of data loss by automatically background scanning a data set to detect candidate sensitive data items. For at least some of the candidate sensitive data items that are deemed not to concretely classified as sensitive, a dissolvable encryption is applied to the data item to at least temporarily protect the data item.

At least some embodiments described herein relate to the use of such a data item. When a user requests access to the data item, the system determines that the data item has been dissolvably encrypted and that the user is authorized to define the sensitivity of the data item. For instance, perhaps any user who is authorized to access the data item might be considered authorized also to define the sensitivity of the data item. In response, the user is allowed to direct the system as to whether the data item is to be concretely encrypted (e.g., if the user was to confirm the data item as sensitive), or whether the dissolvable encryption of the data item is to be dissolved (e.g., if the user was to confirm the data item as not sensitive).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein related to reducing risk of data loss by automatically background scanning a data set to detect candidate sensitive data items. For at least some of those candidate sensitive data items that are deemed not to be concretely classified as sensitive, a dissolvable encryption is applied to the data item to at least temporarily protect the data item.

At least some embodiments described herein relate to the use of such a data item. When a user requests access to the data item, the system determines that the data item has been dissolvably encrypted and that the user is authorized to define the sensitivity of the data item. For instance, perhaps any user who is authorized to access the data item might be considered authorized also to define the sensitivity of the data item. In response, the user is allowed to direct the system as to whether the data item is to be concretely encrypted (e.g., if the user was to confirm the data item as sensitive), or whether the dissolvable encryption of the data item is to be dissolved (e.g., if the user was to confirm the data item as not sensitive).

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
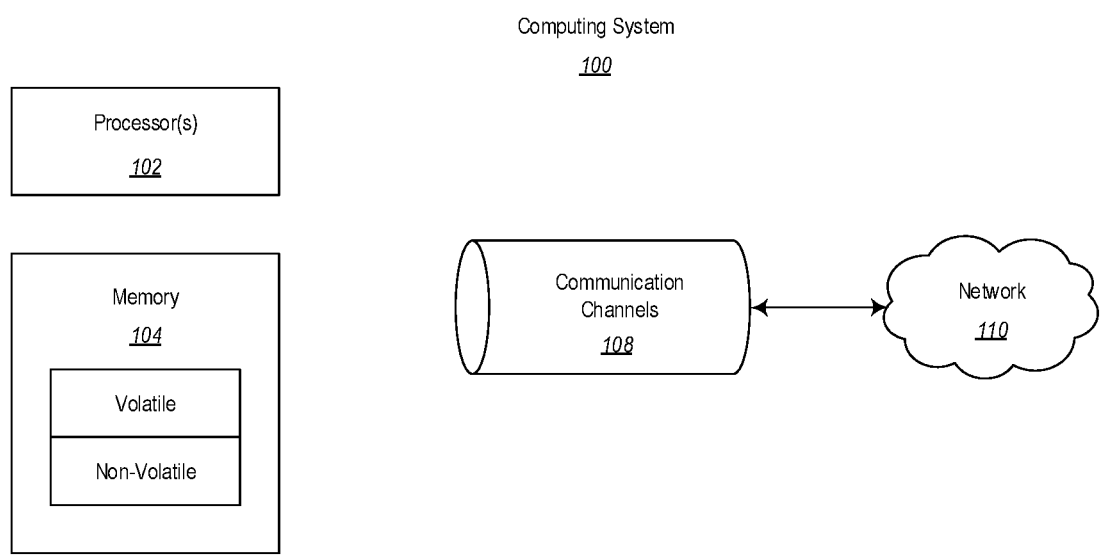
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, digital scanners, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
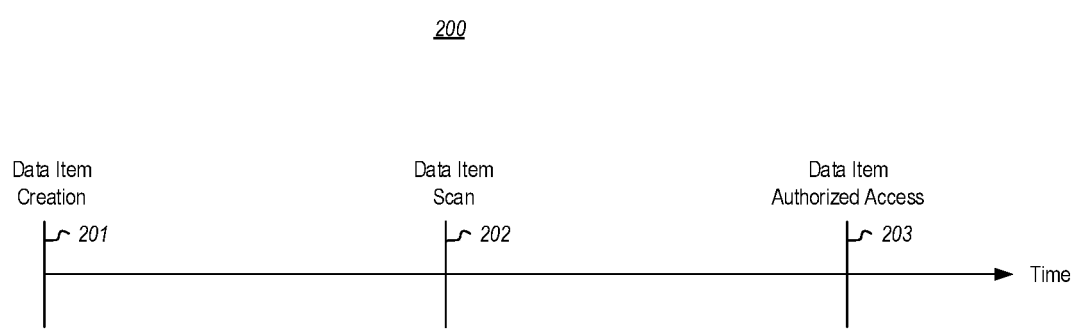
FIG. 2 illustrates a lifecycle diagram of a data item in which the data item is first created, then scanned for sensitivity, and then accessed by an authorized user.

FIG. 2 illustrates a lifecycle diagram 200 of a data item. Initially, the data item is created (event 201). Later, the data item is scanned (event 202) to try to identify a sensitivity of the data item. After the data item is scanned, the data item is accessed (event 203) by an authorized user. The user might have also accessed the data item prior to it being scanned (event 202), and one or more other users may have accessed the data item after it was scanned, but for purposes of the principles described herein, it is a user that is authorized to define the sensitivity of the data item first accessing the data item (event 203) after the scanning operation (event 202) that is of significance. It may be minutes, hours, days, months, years, or even decades between events 201 and 202, and between events 202 and 203. In the case in which any user having access to the data item is authorized to define the sensitivity of the data item, the event 203 may be the first time that an authorized user has accessed the data item.

At creation time (event 201), perhaps the user did not specify a sensitivity status (e.g., sensitive or not sensitive) of the data item, or perhaps the application that generated the data item did not even provide a mechanism to specify sensitivity. Over time, a large amount of such unspecified data items may build up in a given data store.

Figure 3:
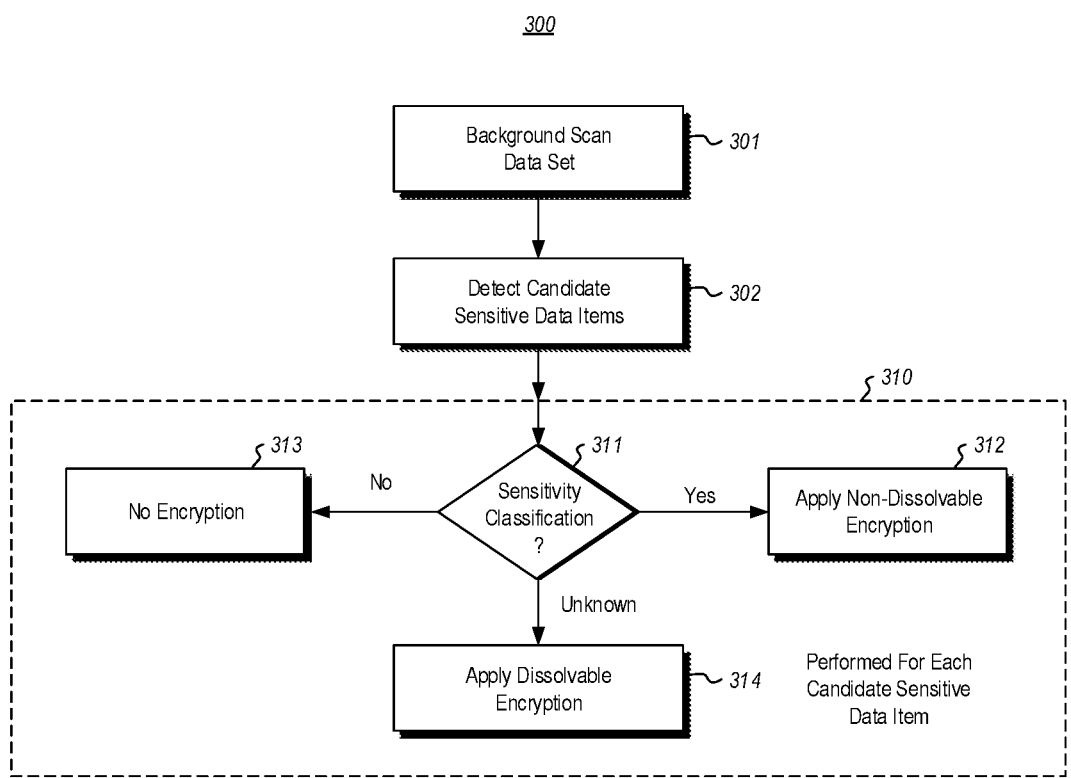
FIG. 3 illustrates a flowchart of a method for classifying data items in accordance with the principles described herein, in which the data item may receive a sensitive classification, a non-sensitive classification, and an unknown sensitivity classification.
Figure 4:
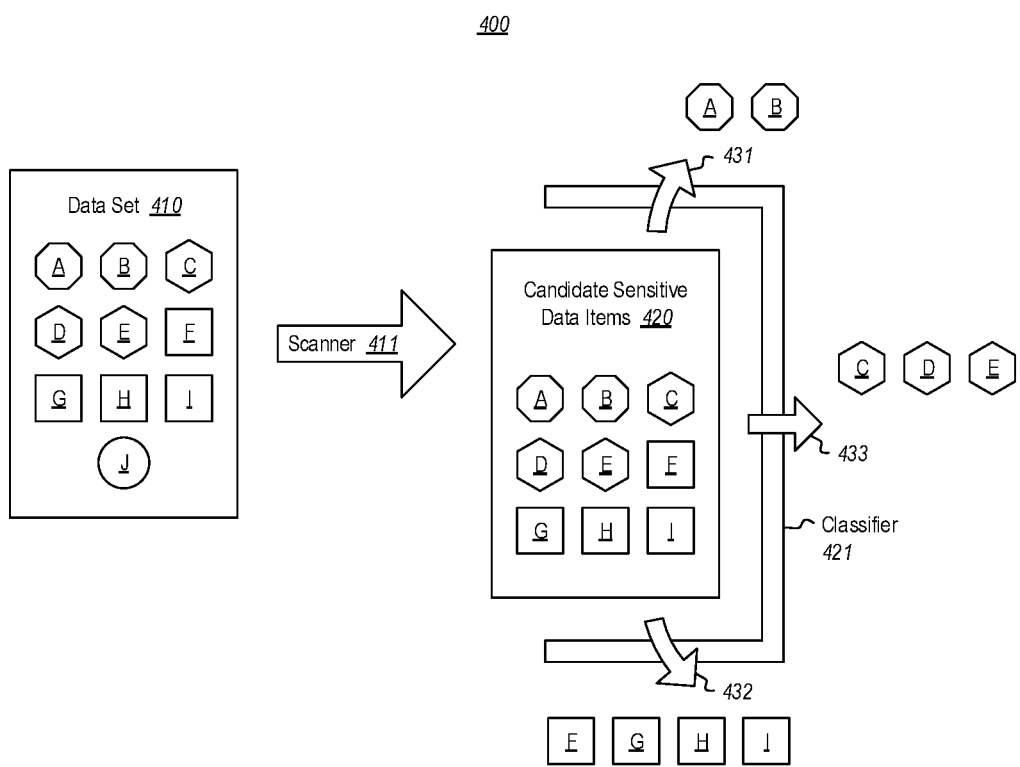
FIG. 4 illustrates an example environment in which a data set is scanned and otherwise subject to the method FIG. 3 to thereby be assigned to one of the sensitivity categories.

FIG. 3 illustrates a flowchart of a method 300 for classifying data items. For instance, the method 300 may be performed to thereby constitute event 202 for a large number of data items previously created. The principles described herein operate regardless of when the various data items were created, and how, and even if the data items were created at different times and by different applications. FIG. 4 illustrates an example environment 400 in which a data set is scanned and otherwise subject to the method 300 of FIG. 3. Accordingly, the method 300 will be described with frequent reference to the environment 400 of FIG. 4.

The method 300 includes automatically background scanning a data set (act 301) to detect candidate sensitive data items (act 302). For instance, in the example environment 400, a data scanner 411 scans a data set 410 to generate a list of candidate sensitive data items 420. The candidate sensitive data items 420 are those data items that are going to be further evaluated to determine if the sensitivity of the data items can be evaluated.

The candidate sensitive data items 420 may include all of the data items in the data set 410. For instance, the data scanner 411 may perform a trivial operation of simply indicating that all of the data items in the data set 410 are to be candidate sensitive data items 420. However, the data scanner 411 might also be more complex by comparing policy criteria to one or more characteristics of each data item to determine whether the corresponding data item is to be a candidate sensitive data item. In that case, the candidate sensitive data items 420 may include less than all of the data items in the data set 410.

The data set 410 may include any number of data items without restriction. The principles described herein may be applied to any number of data items within any data set. For purposes of discussion only, the data set 410 is illustrated as including ten data items A through J. The candidate sensitive data items 420 are illustrated as including nine data items A through I. In this case, the data item J (abstractly represented as circular) was not selected by the scanner 411 as a candidate sensitive data item subject to subsequent classification. For instance, perhaps data item J has already been classified previously to the satisfaction of the scanner 411. Alternatively, perhaps the data item J is not of a file type that the scanner 411 is capable of scanning. Alternatively, perhaps the data item J is not of a file type that there is interest in scanning.

Next, the content of box 310 is performed for each candidate sensitive data item. For instance, the candidate data items are each classified (decision block 311). Note there is no requirement that all of the candidate sensitive data items be identified (act 302) prior to beginning the classification (decision block 311). In fact, a data item may be immediately classified (decision block 311) after it is identified as a candidate sensitive data item (act 302). For instance, in FIG. 4, the classifier 421 classifies each of the candidate sensitive data items 420.

Optionally, for each of at least some of the plurality of candidate sensitive data items, the method classifies the candidate data item as sensitive ("Yes" in decision block 311). For each of at least some of the candidate sensitive data items classified as sensitive, the method applies non-dissolvable encryption (act 312) to the corresponding data item. In this description and in the claims, non-dissolvable encryption is encryption that is not dissolvable encryption. "Dissolvable encryption" is encryption that can be undone provided authorization is given from an authorized user who is authorized to access the encryption. As an example, non-dissolvable encryption might mean that even if the encrypted item is decrypted, the encryption container will not grant permission to extract the information from the encryption container. In this case, dissolvable encryption would mean that once the encrypted item is decrypted, the information is authorized to be extracted on condition of the user having permission to access the encryption. For instance, in FIG. 4, the classifier 421 applies policy 431 to assign a sensitive status to data items A and B. The sensitive data items are each abstractly represented in FIG. 4 with an octagon-shaped element.

Optionally, for each of at least some of the plurality of candidate sensitive data items, the data item is classified as non-sensitive ("No" in decision block 303). Accordingly, no encryption is applied (act 313) to the data item. For instance, in FIG. 4, the classifier 421 applies policy 433 to assign a non-sensitive status to data items F, G, H and I. The non-sensitive data items are abstractly represented in FIG. 4 with square-shaped element.

The remaining data items are not classified as sensitive or non-sensitive. They lie in that gray area for which the classifier cannot, with high confidence, determine whether or not the data item is sensitive. For each of at least some of the candidate sensitive data items that are not concretely classified as sensitive or non-sensitive, the method 300 characterizes the data item as being of unknown sensitivity ("Unknown" in decision block 311). The method 300 then applies dissolvable encryption (act 314) to the corresponding data item to at least temporarily protect the data item. For instance, in FIG. 4, the classifier 421 applies policy 432 to assign an unknown sensitivity status to data items C, D and E. The unknown sensitivity data items are abstractly represented in FIG. 4 with hexagon-shaped element.

In one embodiment, the classifier always classifies the candidate sensitive data items as being of unknown sensitivity. For instance, none of the data items may be classified as sensitive ("Yes" in decision block 311) or non-sensitive ("No" in decision block 311). In that case, an authorized user may later assign sensitivity to each data item as it is accessed.

Accordingly, the end result of the scan is a set of data items (zero or more) classified as sensitive, a set of data items (zero or more) identified as non-sensitive, and a set of data items (some to all) identified as having unknown sensitivity. Referring again to FIG. 2, this classification occurs at data item scan time (event 202).

Recall that at some point after the data item scan time, an authorized user (that is authorized to assign a sensitivity to the data item) may then access the data item (event 203 in FIG. 2). When a data item that has previously been assigned an unknown sensitivity status is accessed by such an authorized user, the unknown sensitivity status of the data item may be resolved one way or another. In one embodiment, any user who is authorized to access the data item is also authorized to define the sensitivity of the data item. In another embodiment, a user who is authorized to define the sensitivity of the data item would also have to have authority to access the data item. After all, in almost all cases, there would be benefit by allowing the user to access the data item in at least some form in order to obtain proper intelligence regarding how to classify the data item.

Figure 5:
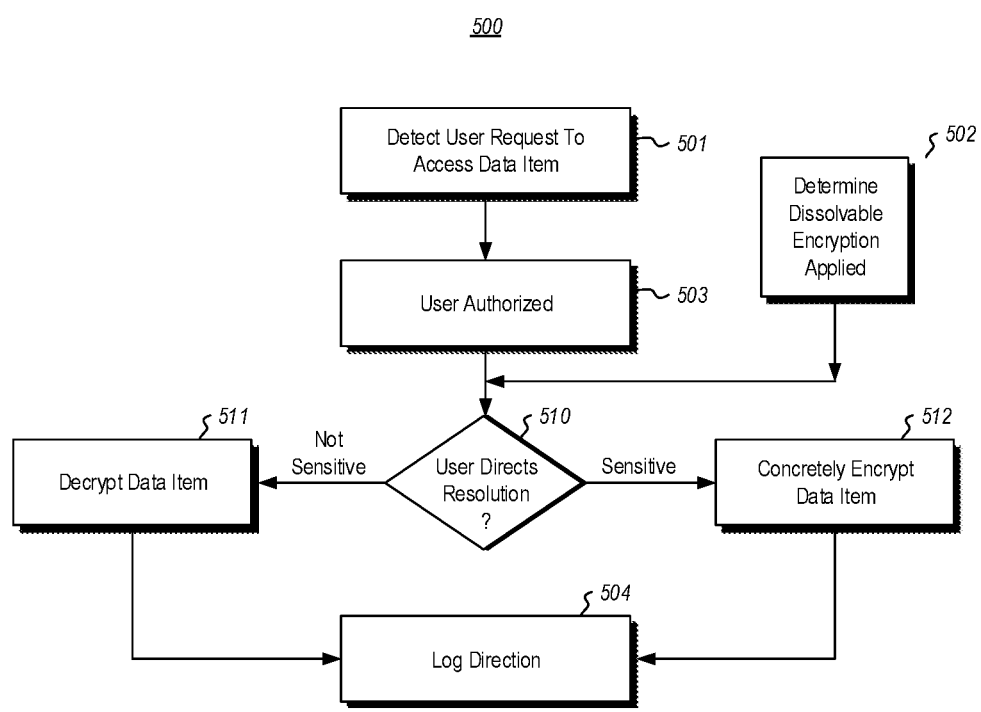
FIG. 5 illustrates a flowchart of a method for using a data item that a scanning operation has previously determined cannot be concretely classified as sensitive and thus has dissolvable encryption applied.

FIG. 5 illustrates a flowchart of a method 500 for using a data item which a scanning operation has previously determined cannot be concretely classified as sensitive and thus has dissolvable encryption applied. The method 500 is initiated upon detecting a user request to access the data item (act 501). The method 500 may be initiated each time a data item that is assigned an unknown sensitivity status is first accessed by an authorized user after the time that the data item was scanned for sensitivity and assigned the unknown sensitivity status.

After the user accesses the data item of unknown sensitivity, it is then determined that the user is authorized to define the sensitivity of the data item (act 503). For instance, in some embodiments, only the user that created the data item is authorized to define the sensitivity of the data item. In a less stringent embodiment, users that have authorization to write to the data item may be authorized to define the sensitivity of the data item. In an even less stringent embodiment, any user having any access privileges at all to the data item may be authorized to define the sensitivity of the data item.

The method 500 also determines that the data item has dissolvable encryption applied (act 502). The act 501 is shown in parallel with acts 501 and 503 to emphasize that there is no logically or temporal dependency between act 502 and act 501, or between act 502 and act 503. The user is then allowed (decision block 510) to direct whether the data item is to be concretely encrypted (act 511) so as to no longer be dissolvable, or whether the dissolvable encryption of the data item is to be dissolved (act 512) resulting in an unprotected data item which is classified as not sensitive. The direction of the user is then logged (act 504). Accordingly, the user may be later held to account if he or she made an improper decision regarding sensitivity of the data item.

Figure 6:
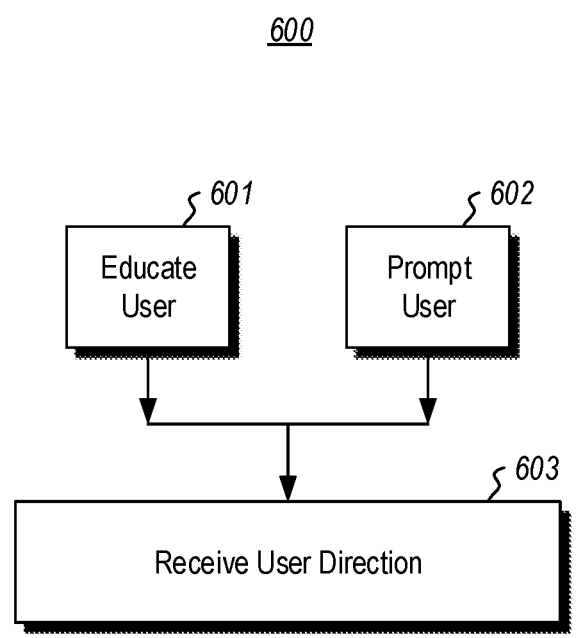
FIG. 6 illustrates a flowchart of a method for enabling the user to direct how to treat the data item.

FIG. 6 illustrates a flowchart of a method 600 for enabling the user to direct how to treat the data item, and represents an example of how decision block 510 of FIG. 5 may be implemented. The method 600 may involve educating the user (act 601). For instance, the user may be notified that the data item has been evaluated for sensitivity but the sensitivity could not be determined, that the user is authorized to define the sensitivity of the item, and further than the direction of the user may be logged. The user may further be prompted for direction to define the sensitivity. The user's direction is received (act 603), and that direction is used to branch the decision block 510 of FIG. 5.

Once the sensitivity of the data item is defined by the user (as a result of decision block 503), or by the system (in "Yes" or "No" of decision block 311), that sensitivity definition may persist with the data item. Thus, in future background scans, the scanner may ignore the data item since its sensitivity is already defined. For instance, in FIG. 4, the data item may one of those data items within the data set 410 that is ignored by the scanner 411. Abstractly speaking, the data item becomes circular, which represents, as it did for data item J, that the scanner does not consider the data item as a candidate sensitive data item in future scans. That said, a change in sensitivity policy followed by the classifier 421 may cause that data item to be reevaluated despite it having already having an assigned sensitivity status. Thus, a sensitivity designation may go stale over time, and thus be reevaluated. After all, the sensitivity of a data item may change over time.

The principles described herein provide distinct advantages over the prior art in that there is no longer a balance between avoiding customer annoyance and increasing security. For instance, in conventional background scanning, the scanning results in either the data item being marked as sensitive or not sensitive. There is no inbetween. Accordingly, conventional background scanning introduced the distinct possibility of false positives and false negatives for data items that are near the decision threshold.

For instance, a false positive occurs when a data item that is really not sensitive is decided as being sensitive. This results in annoyance to the user since additional standards are applied, processing resources applied, and actions limited when a user accesses the non-sensitive resources. As an example, a user might type an e-mail with lots of numbers that seem to the scanning operation to be credit card numbers, but in fact they are just part numbers to car engine that the user is assembling as a hobby. The false positive might restrict the recipient from forwarding the e-mail to anyone, or the sender might be restricted on including anyone in the cc line.

A false negative occurs when the data item is sensitive, but the scan does not recognize the sensitivity. This results in potential for a security breach, as access to the data item is not properly restricted.

If the decision threshold is low, then the background scanning aggressively assigns the sensitive status, and there are many false positives, though with the benefit of increased security. If the decision threshold is high, then the background scanning is permissive, and might tend to allow sensitive data to be leaked, albeit with fewer instances of users being denied the ability to operate on non-sensitive data.

In accordance with the principles described herein, there is a space between the decision threshold for assigning a sensitive status and a decision threshold for assigning a non-sensitive status. They are two distinct decision thresholds. The middle region between the decision thresholds is a gray area where the scanning operation simply cannot concretely determine whether the data item is sensitive or not. The principles described herein treat these uncertain data items differently by asking for the authorized user's help the next time the authorized user accesses the data item. In the meantime, between the time that the scan operation occurs (event 202) and the time that the user accesses the data item (act 203), the data item exists in an encrypted state and is thus protected, just in case. However, the encryption is a dissolvable encryption that can be undone with the authorization of the authorized user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors and a storage device, for protecting data items, the method comprising:

classifying a candidate sensitive data item as having an unknown sensitivity, the unknown sensitivity classification comprising a sensitivity classification that is to be determined as either sensitive or non-sensitive by an authorized user upon access of the candidate sensitive data item by the authorized user;

based at least on the candidate sensitive data item being classified as having an unknown sensitivity, applying dissolvable encryption to the candidate sensitive data item, applying the dissolvable encryption comprising using a dissolvable encryption container to encrypt the candidate sensitive data item such that upon decryption of the candidate sensitive data item by the authorized user, the candidate sensitive data item is extractable from the dissolvable encryption container by the authorized user; and subsequent to applying the dissolvable encryption to the candidate sensitive data item, receiving a user-specified indication of whether the candidate sensitive data item is sensitive or non-sensitive, including:

detecting a request from a user to access the candidate sensitive data item;

detecting that the user is authorized to define sensitivity of the candidate sensitive data item; and in response to the request, and further in response to detecting that the user is authorized, allowing the user to direct whether the candidate sensitive data item is sensitive and is therefore to be concretely encrypted with non-dissolvable encryption, or whether the candidate sensitive data item is non-sensitive such that the dissolvable encryption of the candidate sensitive data item is to be dissolved; and based at least on the user-specified indication, performing one of the following:

based at least on the user-specified indication indicating that the candidate sensitive data item is sensitive, concretely encrypting the candidate sensitive data item with non-dissolvable encryption, including applying a non-dissolvable encryption container to the candidate sensitive data item that denies permission for a user to extract the candidate sensitive data item from the non-dissolvable encryption container, even if the candidate sensitive data item has been decrypted; or based at least on the user-specified indication indicating that the candidate sensitive data item is non-sensitive, dissolving the dissolvable encryption of the candidate sensitive data item, resulting in an unprotected data item which is classified as not sensitive.

2. The method of claim 1, further comprising logging the direction of the user.

3. The method of claim 1, further comprising background scanning a data set to detect a plurality of candidate sensitive data items stored at the storage device, and wherein less than all of the data items in the data set are characterized as candidate sensitive data items in that the background scanning uses one or more criteria of each data item to determine whether the corresponding data item is to be a candidate sensitive data item.

4. The method of claim 1, wherein the computer system comprises one of a camera, a digital scanner, a laptop computer, or a mobile telephone.

5. The method of claim 1, wherein the user-specified indication indicates that the candidate sensitive data item is sensitive, and wherein the method includes performing the concrete encryption of the candidate sensitive data item.

6. The method of claim 1, wherein the user-specified indication indicates that the candidate sensitive data item is non-sensitive, and wherein the method includes performing the dissolving of the dissolvable encryption of the candidate sensitive data item.

7. A computing system comprising:

one or more processors; and one or more computer-readable media accessible to the one or more processors, the computer-readable media having stored thereon computer-executable instructions that are executable by the one or more processors to cause the computing system to perform at least the following:

classify a candidate sensitive data item as having an unknown sensitivity, the unknown sensitivity classification comprising a sensitivity classification that is to be determined as either sensitive or non-sensitive by an authorized user upon access of the candidate sensitive data item by the authorized user;

based at least on the candidate sensitive data item being classified as having an unknown sensitivity, apply dissolvable encryption to the candidate sensitive data item, applying the dissolvable encryption comprising using a dissolvable encryption container to encrypt the candidate sensitive data item such that upon decryption of the candidate sensitive data item by the authorized user, the candidate sensitive data item is extractable from the dissolvable encryption container by the authorized user; and subsequent to applying the dissolvable encryption to the candidate sensitive data item, receive a user-specified indication of whether the candidate sensitive data item is sensitive or non-sensitive, including:

detecting a request from a user to access the candidate sensitive data item;

detecting that the user is authorized to define sensitivity of the candidate sensitive data item; and in response to the request, and further in response to detecting that the user is authorized, allowing the user to direct whether the candidate sensitive data item is sensitive and is therefore to be concretely encrypted with non-dissolvable encryption, or whether the candidate sensitive data item is non-sensitive such that the dissolvable encryption of the candidate sensitive data item is to be dissolved; and based at least on the user-specified indication, perform one of the following:

based at least on the user-specified indication indicating that the candidate sensitive data item is sensitive, concretely encrypting the candidate sensitive data item with non-dissolvable encryption, including applying a non-dissolvable encryption container to the candidate sensitive data item that denies permission for a user to extract the candidate sensitive data item from the non-dissolvable encryption container, even if the candidate sensitive data item has been decrypted; or based at least on the user-specified indication indicating that the candidate sensitive data item is non-sensitive, dissolving the dissolvable encryption of the candidate sensitive data item, resulting in an unprotected data item which is classified as not sensitive.

8. The computing system of claim 7, the computing system being a camera.

9. The computing system of claim 7, the computing system being a digital scanner.

10. The computing system of claim 7, the computing system being a laptop computer.

11. The computing system of claim 7, the computing system being a mobile telephone.

12. The computing system of claim 7, wherein the computing system also logs the direction of the user.

13. The computing system of claim 7, wherein the user-specified indication indicates that the candidate sensitive data item is sensitive, and wherein the computing system performs the concrete encryption of the candidate sensitive data item.

14. The computing system of claim 7, wherein the user-specified indication indicates that the candidate sensitive data item is non-sensitive, and wherein the computing system performs the dissolving of the dissolvable encryption of the candidate sensitive data item.

15. The computing system of claim 7, wherein the computing system also background scans a data set to detect a plurality of candidate sensitive data items stored at a storage device, and wherein less than all of the data items in the data set are characterized as candidate sensitive data items in that the background scanning uses one or more criteria of each data item to determine whether the corresponding data item is to be a candidate sensitive data item.

16. A computer program product comprising one or more hardware storage devices having stored thereon computer-executable instructions that are executable by one or more processors of a computing system to cause the computing system to perform at least the following:

classify a candidate sensitive data item as having an unknown sensitivity, the unknown sensitivity classification comprising a sensitivity classification that is to be determined as either sensitive or non-sensitive by an authorized user upon access of the candidate sensitive data item by the authorized user;

based at least on the candidate sensitive data item being classified as having an unknown sensitivity, apply dissolvable encryption to the candidate sensitive data item, applying the dissolvable encryption comprising using a dissolvable encryption container to encrypt the candidate sensitive data item such that upon decryption of the candidate sensitive data item by the authorized user, the candidate sensitive data item is extractable from the dissolvable encryption container by the authorized user; and subsequent to applying the dissolvable encryption to the candidate sensitive data item, receive a user-specified indication of whether the candidate sensitive data item is sensitive or non-sensitive, including:

detecting a request from a user to access the candidate sensitive data item;

detecting that the user is authorized to define sensitivity of the candidate sensitive data item; and in response to the request, and further in response to detecting that the user is authorized, allowing the user to direct whether the candidate sensitive data item is sensitive and is therefore to be concretely encrypted with non-dissolvable encryption, or whether the candidate sensitive data item is non-sensitive such that the dissolvable encryption of the candidate sensitive data item is to be dissolved; and based at least on the user-specified indication, perform one of the following:

based at least on the user-specified indication indicating that the candidate sensitive data item is sensitive, concretely encrypting the candidate sensitive data item with non-dissolvable encryption, including applying a non-dissolvable encryption container to the candidate sensitive data item that denies permission for a user to extract the candidate sensitive data item from the non-dissolvable encryption container, even if the candidate sensitive data item has been decrypted; or based at least on the user-specified indication indicating that the candidate sensitive data item is non-sensitive, dissolving the dissolvable encryption of the candidate sensitive data item, resulting in an unprotected data item which is classified as not sensitive.

17. The computer program product of claim 16, wherein the computing system also logs the direction of the user.

18. The computer program product of claim 16, wherein the user-specified indication indicates that the candidate sensitive data sensitive item is sensitive, and wherein the computing system performs the concrete encryption of the candidate sensitive data item.

19. The computer program product of claim 16, wherein the user-specified indication indicates that the candidate sensitive data item is non-sensitive, and wherein the computing system performs the dissolving of the dissolvable encryption of the candidate sensitive data item.

20. The computer program product of claim 16, wherein the computing system also background scans a data set to detect a plurality of candidate sensitive data items stored at the storage device, and wherein less than all of the data items in the data set are characterized as candidate sensitive data items in that the background scanning uses one or more criteria of each data item to determine whether the corresponding data item is to be a candidate sensitive data item.

* * * * *